(12) United States Patent
Hsu

(10) Patent No.: US 6,486,772 B1
(45) Date of Patent: Nov. 26, 2002

(54) PRESSURE INDICATING DEVICE FOR TUBE-LESS TIRE

(76) Inventor: Mu-Chuan Hsu, No. 15-2, Kwei The St., Ta-Tung Dist, Taipei (TW)

( * ) Notice: Subject to any disclaimer, the term of this patent is extended or adjusted under 35 U.S.C. 154(b) by 0 days.

(21) Appl. No.: 09/961,586

(22) Filed: Sep. 24, 2001

(51) Int. Cl.[7] ............................................... B60C 23/00
(52) U.S. Cl. ..................... 340/442; 73/146.3; 73/146.8; 116/34 R
(58) Field of Search ................... 340/442; 73/146.3, 73/146.8; 116/34 R

(56) References Cited

U.S. PATENT DOCUMENTS 5,606,123 A * 2/1997 Rabizadeh ................ 73/146.8
5,770,797 A * 6/1998 Lapohn ..................... 73/146.8
5,819,779 A * 10/1998 Takemura et al.
2001/0023613 A1 * 9/2001 Lemberger et al. ........ 73/146.8

* cited by examiner

Primary Examiner—Daniel J. Wu
(74) Attorney, Agent, or Firm—Alan D. Kamrath; Rider, Bennett, Egan & Arundel

(57) ABSTRACT

A pressure indicating device of a tube-less tire of a motor vehicle is on a position surrounded by the tire and faced outward for ease of reading. The device comprises an integral pipe formed in a rim being in communication between the device and the tire so that the pressure of the tire is represented on the device by communicating air through the pipe. Hence, before starting the vehicle, the driver may know the condition of each tire by visually inspecting a reading of the pressure indicating device. Once the reading of one device is abnormal, the driver can take a suitable action, i.e., replacing tire, accordingly.

6 Claims, 4 Drawing Sheets

PRESSURE INDICATING DEVICE FOR TUBE-LESS TIRE

FIELD OF THE INVENTION

The present invention relates to tires of motor vehicles and more particularly to a pressure indicating device for a tube-less tire of a motor vehicle with improved characteristics.

BACKGROUND OF THE INVENTION

Conventionally, tube-less tires are used for light load motor vehicles. A rubber pad is provided along an inner hoop of such tube-less tire for maintaining an air-tightness of the tire when fixed about a rim. In the case of the tire air-tightness being broken while driving, a vehicle equipped with tube-less tires can still travel a predetermined distance without causing trouble. However, the whole wheel assembly may be damaged or a traffic accident can even be caused if the driver is not aware of the broken tire(s). Thus, it is desirable to provide a pressure indicating device for a tube-less tire so that the driver can be aware of the pressure of each tire before driving or while driving.

SUMMARY OF THE INVENTION

It is therefore an object of the present invention to provide a pressure indicating device of a tube-less tire of a motor vehicle. The device comprises a display on a position surrounded by the tire and faced outward; and an integral pipe formed in a rim being in communication between the device and the tire so that the pressure of the tire is represented on the device by communicating air through the pipe.

It is another object of the present invention to provide a pressure indicating device of a tube-less tire of a motor vehicle. The device comprises a display on a position surrounded by the tire and faced outward; a pipe having one end in communication with the device; and a hole on a rim being in communication with the other end of the pipe so that the pressure of the tire is represented on the device by communicating air through the hole and the pipe.

The above and other objects, features and advantages of the present invention will become apparent from the following detailed description taken with the accompanying drawings.

DETAILED DESCRIPTION OF THE PREFERRED EMBODIMENTS

Figure 1:
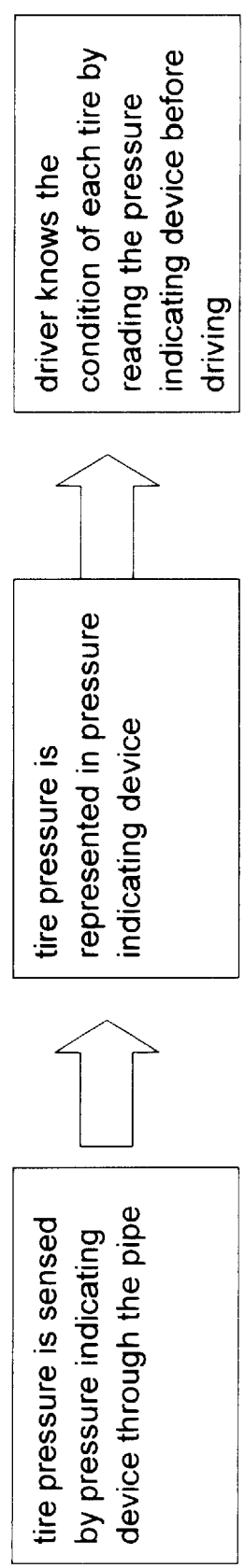
FIG. 1 is a flow chart illustrating a process of informing the driver about the pressure of a tube-less tire according to the invention.
Figure 2:
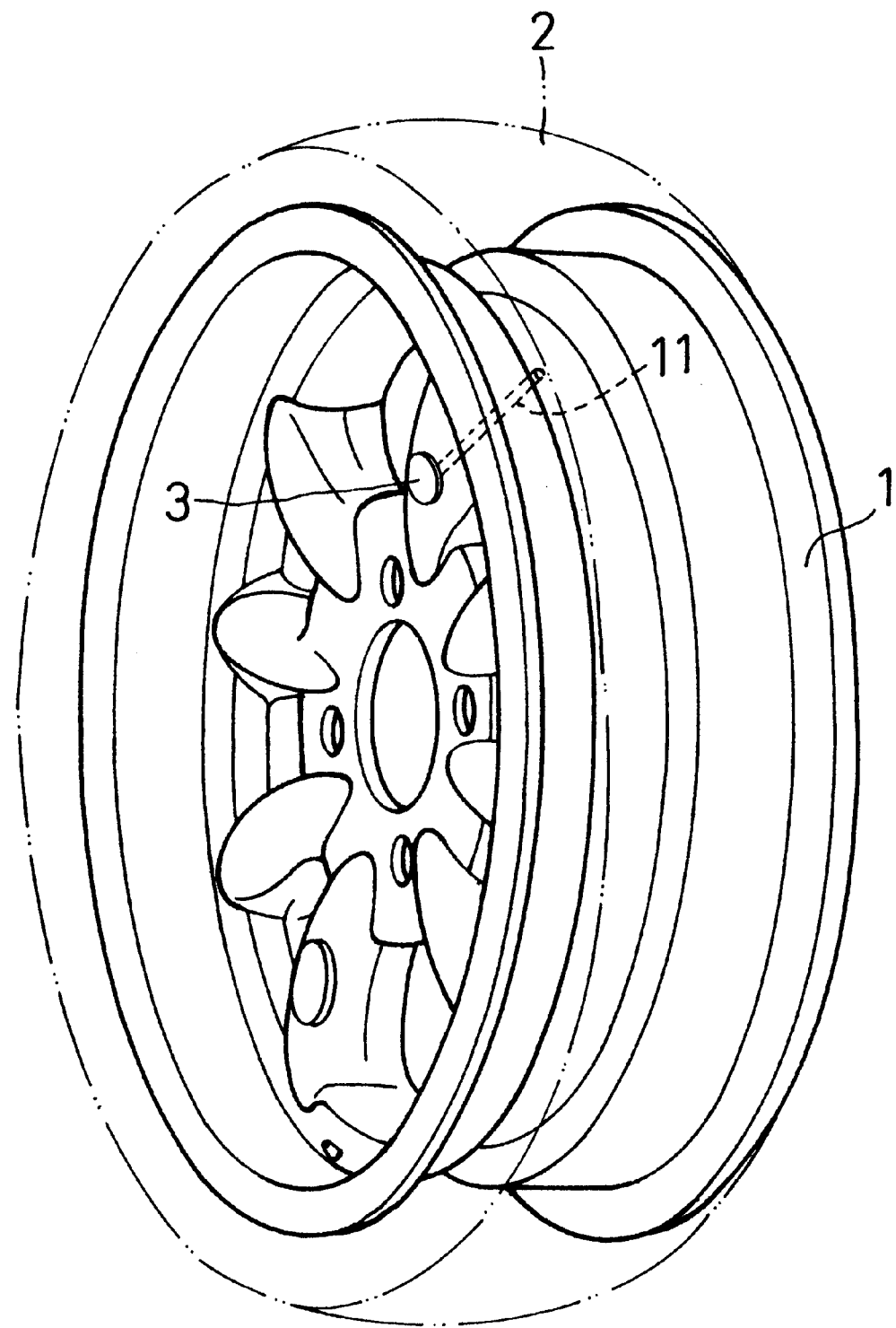
FIG. 2 is a perspective view of a first preferred embodiment of a wheel with a fixed tube-less tire incorporating a pressure indicating device according to the invention.
Figure 3:
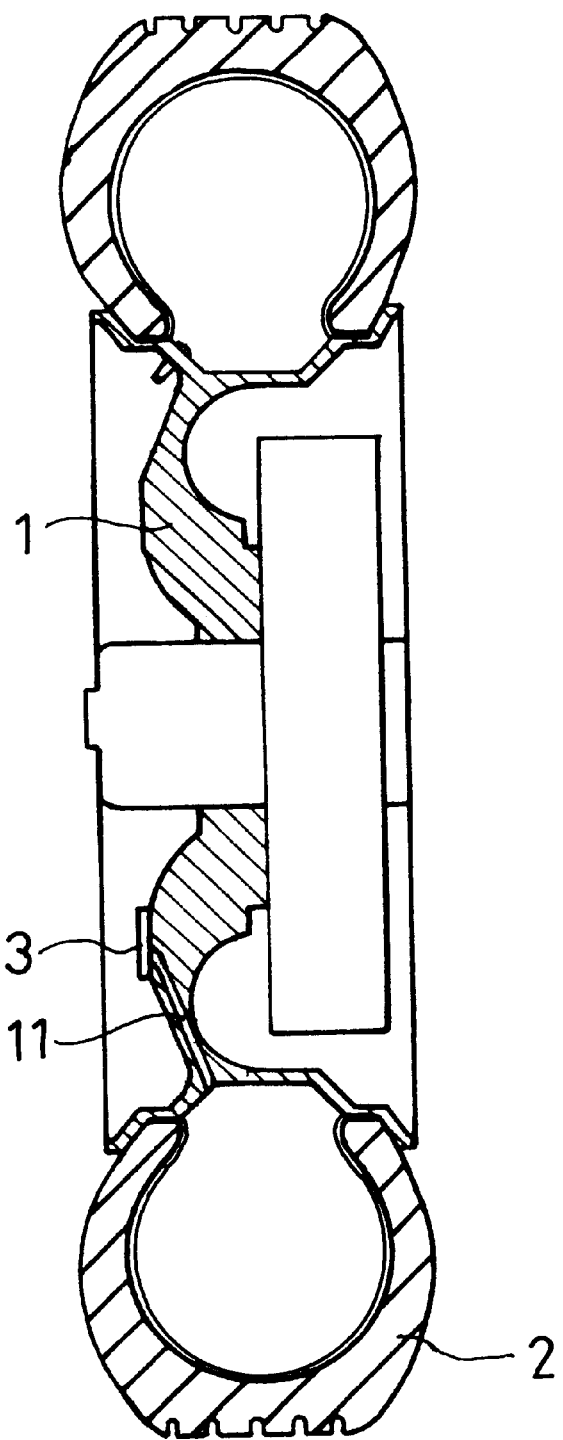
FIG. 3 is a cross-sectional view of the wheel shown in FIG. 2.

Referring to FIGS. 1 to 3, a detailed description of the invention will now be made. A wheel constructed in accordance with the invention comprises a rim 1, a tube-less tire 2 fixed about rim 1, and a pressure indicating device 3 (e.g., a pressure gauge in the embodiment) on an outer surface of the wheel near the hub for ease of reading. An integral pipe 11 is formed in rim 1 and is in communication between pressure indicating device 3 and tire 2. Hence, tire pressure may be shown on the pressure indicating device 3 through the communication of pipe 11.

Before starting the vehicle, the driver may know the condition of each tire 2 by visually inspecting a reading of the pressure indicating device 3. Once the reading of one pressure indicating device 3 is abnormal (i.e., there is leak of tire pressure), the driver can take a suitable action, i.e., replacing tire, accordingly.

Figure 4:
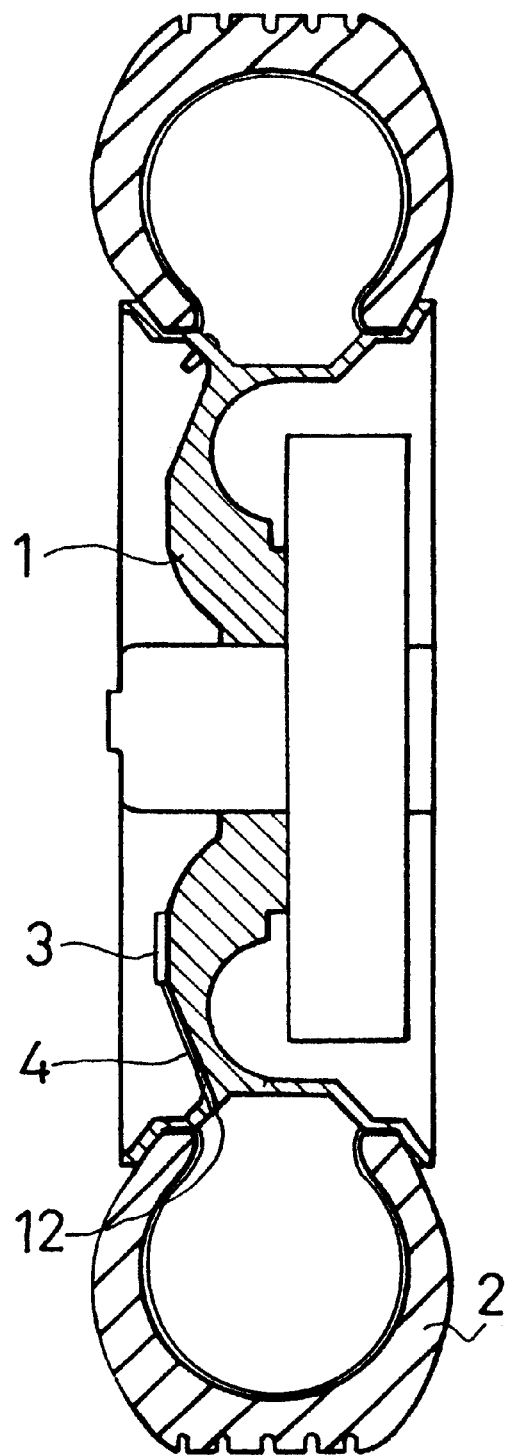
FIG. 4 is a cross-sectional view of a second preferred embodiment of a wheel with a fixed tube-less tire incorporating a pressure indicating device according to the invention.

Referring to FIG. 4, there is shown a second preferred embodiment of the invention. The difference between the first and second preferred embodiments is that the pipe 11 in the first embodiment is replaced by a pipe 4 having one end in communication with the pressure indicating device 3 and a hole 12 on the rim 1 being in communication with the other end of the pipe 4.

While the invention has been described by means of specific embodiments, numerous modifications and variations could be made thereto by those skilled in the art without departing from the scope and spirit of the invention set forth in the claims.

What is claimed is:

1. A device for indicating pressure of a tube-less tire of a motor vehicle, the device comprising:
   a display;
   a rim upon which a tube-less tire is adapted to be fixed, with the rim including an inner surface adapted to be enclosed by the tube-less tire when fixed to the rim and including an outer surface adapted to be outside of the tube-less tire when fixed to the rim; and
   an integral pipe formed in the rim, with the integral pipe and the rim being a single piece, with the integral pipe having a first end formed in the outside surface and in communication with the display and having a second end formed in the inside surface and adapted to be in communication with the tube-less tire when fixed to the rim so that the pressure of the tube-less tire is represented on the display by communicating air through the pipe.

2. The device of claim 1, wherein the display is a pressure gauge.

3. The device of claim 1, wherein the display is located on a position surrounded by the tube-less tire and faced outward.

4. A device for indicating pressure of a tube-less tire of a motor vehicle, the device comprising:
   a display;
   a pipe having one end in communication with the display;
   a rim upon which a tube-less tire is adapted to be fixed, with the rim including an inner surface adapted to be enclosed by the tube-less tire when fixed to the rim and including an outer surface adapted to be outside of the tube-less tire when fixed to the rim; and
   a hole on the rim, with the hole and the rim being a single piece, with the hole having a first end formed in the outside surface and in communication with the other end of the pipe and having a second end formed in the inside surface and adapted to be in communication with the tube-less tire when fixed to the rim so that the pressure of the tube-less tire is represented on the display by communicating air through the hole and the pipe.

5. The device of claim 4, wherein the display is a pressure gauge.

6. The device of claim 4, wherein the display is located on a position surrounded by the tube-less tire and faced outward.

* * * * *